April 22, 1930.  R. KLIMA ET AL  1,755,695
STEAM OPERATED ICE AND SNOW PLOW
Filed Jan. 3, 1927    9 Sheets-Sheet 1

RUDOLF KLIMA
HANS REISCHENBACHER
INVENTORS
By
Their Attorney.

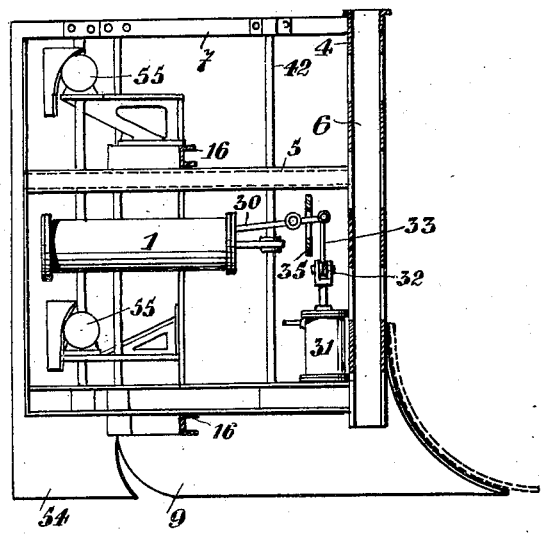

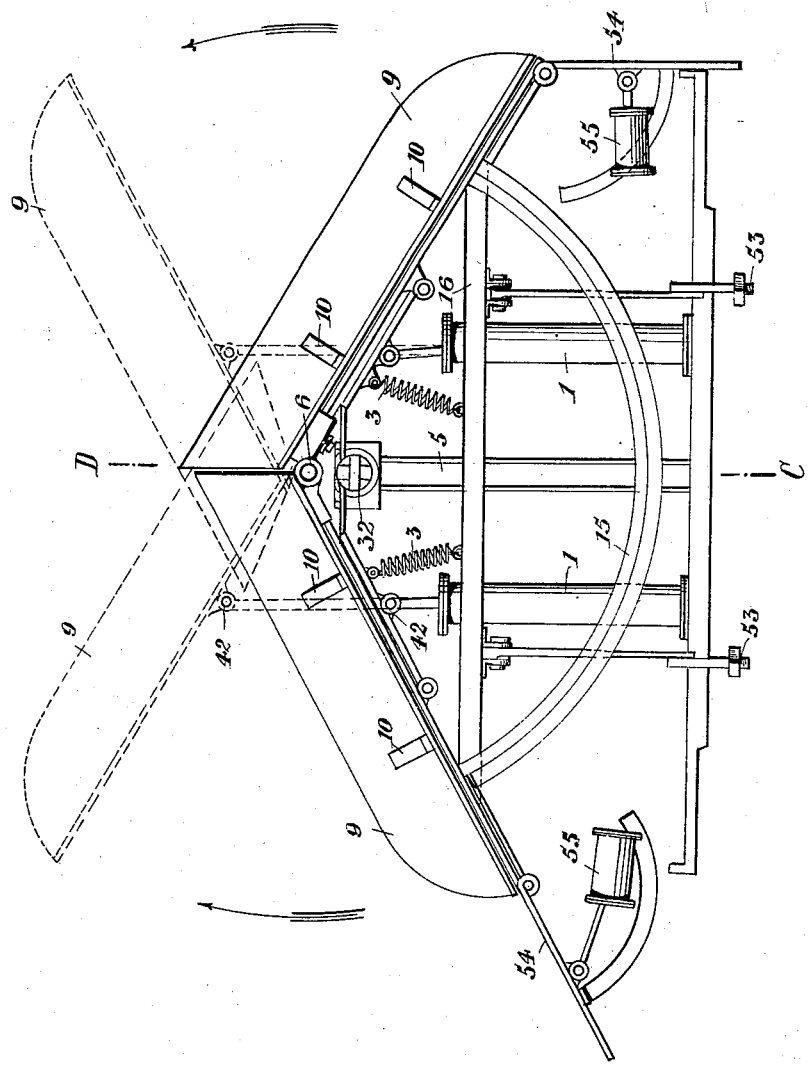

April 22, 1930.  R. KLIMA ET AL  1,755,695
STEAM OPERATED ICE AND SNOW PLOW
Filed Jan. 3, 1927   9 Sheets-Sheet 7
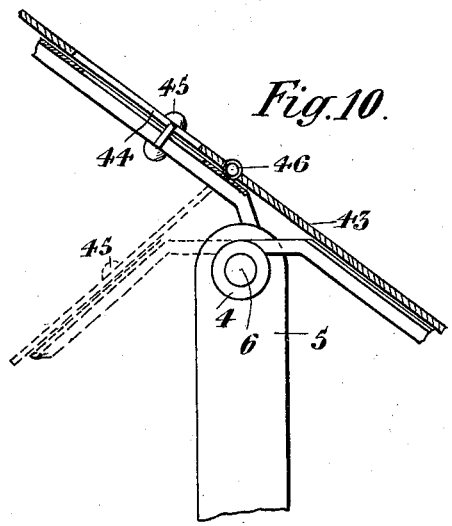
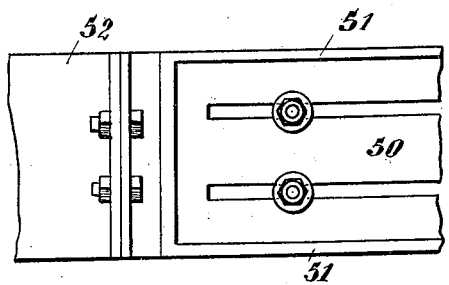
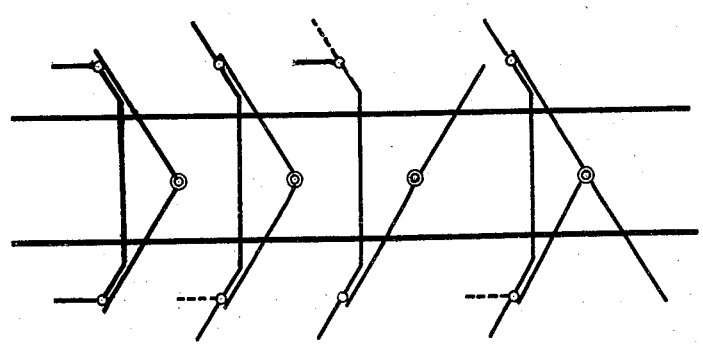
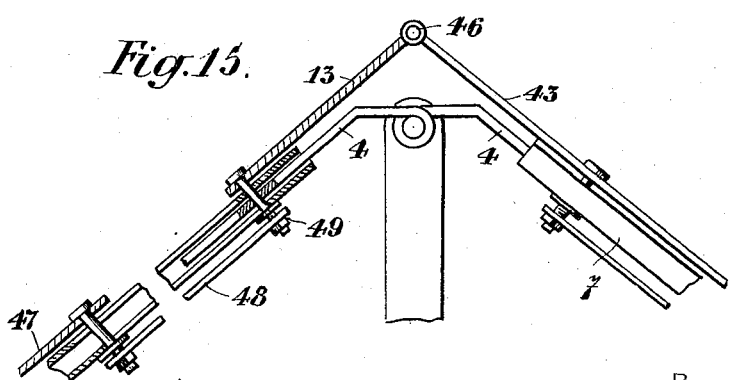
RUDOLF KLIMA
HANS REISCHENBACHER
INVENTORS
By Otto Munk
their Attorney.

April 22, 1930.  R. KLIMA ET AL  1,755,695
STEAM OPERATED ICE AND SNOW PLOW
Filed Jan. 3, 1927   9 Sheets-Sheet 8
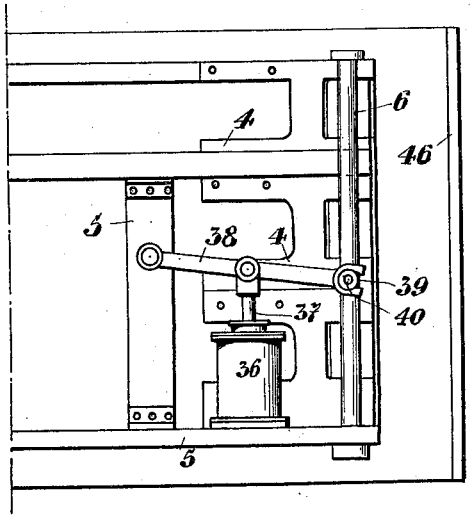
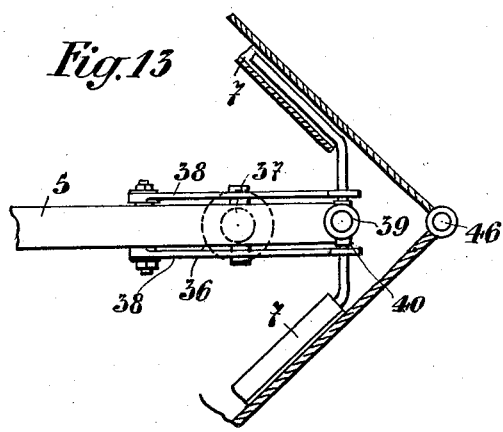
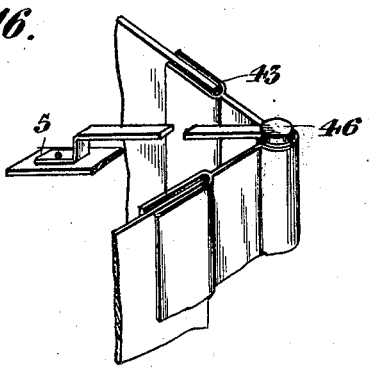
RUDOLF KLIMA
HANS REISCHENBACHER
INVENTORS
By
their Attorney.

April 22, 1930.   R. KLIMA ET AL   1,755,695
STEAM OPERATED ICE AND SNOW PLOW
Filed Jan. 3, 1927   9 Sheets-Sheet 9
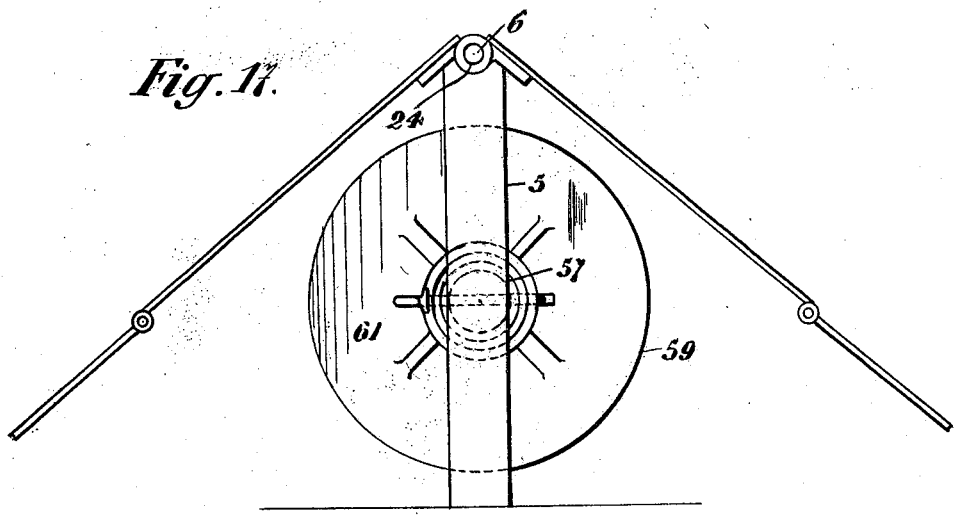
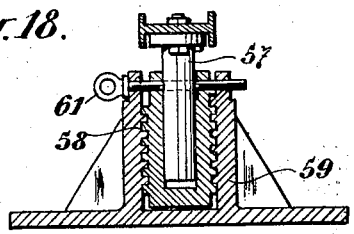
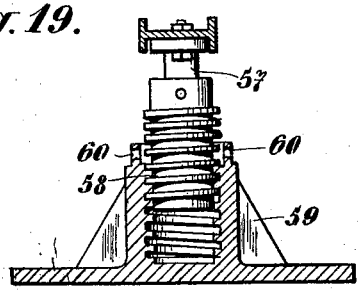
RUDOLF KLIMA
HANS REISCHENBACHER
INVENTORS
By Otto Munk
their Attorney.

Patented Apr. 22, 1930

1,755,695

UNITED STATES PATENT OFFICE

RUDOLF KLIMA AND HANS REISCHENBACHER, OF SALZBURG, AUSTRIA

STEAM-OPERATED ICE AND SNOW PLOW

Application filed January 3, 1927, Serial No. 158,717, and in Austria January 9, 1926.

This invention relates to improvements in steam operated ice and snow plows of the character described in our United States Letters Patent No. 1,601,533, issued September 28, 1926.

The essential feature of the present invention consists in that in snow-plows, the shovels and vanes are preferably operated by steam and arranged on the snow-plow halves, which are disposed on the front wall of the railway engine, and which are rotatable about a pivot, which is disposed in the upright middle axis of the rail-track, in such a manner, that the ordinary angle of the wedge-like shape of the plow can be changed into an inclined surface which clears the snow to one side or the other of the rail track.

Several modes of carrying out the present invention are illustrated by way of example on the accompanying sheets of drawings in which:—

Figure 4:
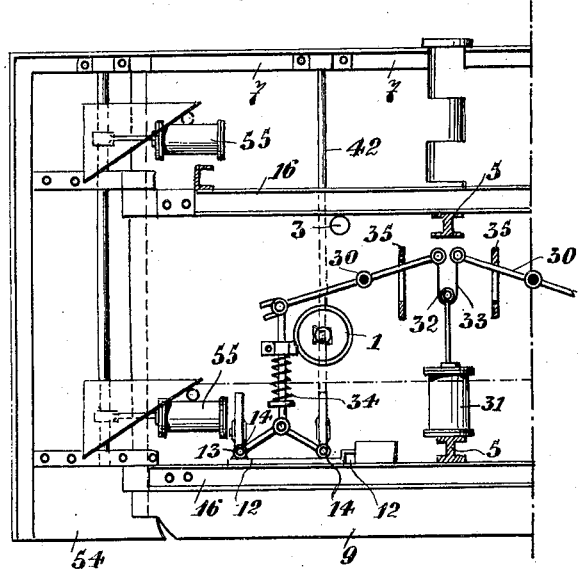
Fig. 4 is a rear view of a third modified construction.
Figure 5:
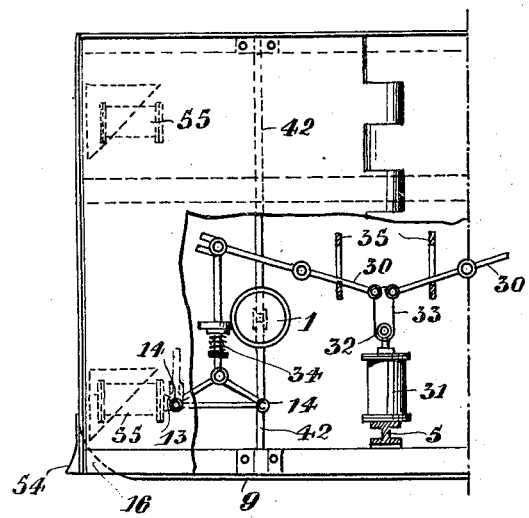

Fig. 5 a front view of the same device shown in Figure 4, showing the covering plate partly broken away, and Fig. 6 a sectional view of the same, the section being taken on lines 6—6 of Figure 7.

Fig. 7 illustrates in plan view, and

Fig. 8 shows diagrammatically the wall-lock and the arrangement for adjusting the shovel or scoop.

Fig. 9 illustrates a rope drive for operating the shovel or scoop of the second construction.

Fig. 9ª is a substantially sectional view of the piston and associated parts taken on lines 9ª—9ª of Figure 9.

Fig. 10 is a sectional view of the cutting edge of the snow plow.

Fig. 11 illustrates diagrammatically the positions into which the snow plow can be turned.

Fig. 12 shows a sectional view of a fourth modified construction of the invention, the section being taken on lines 12—12 of Figure 13.

Fig. 13 is a plan view,

Fig. 14 shows the extensible longitudinal frame,

Fig. 15 illustrates the extension of the wall on turning out, and

Fig. 16 a perspective view of another construction of the cutting edge.

Fig. 17 illustrates in plan view a ground support, and

Figs. 18 and 19 show the latter in the inwardly screwed and outwardly screwed positions respectively.

The steam snow plow, according to the present invention, consists of two parts, namely the outwardly and inwardly rotatable walls which are provided with shovels adapted to be raised and lowered, and the known movable side-wings.

All movable parts are operated by steam, compressed air or the like.

Figure 1:
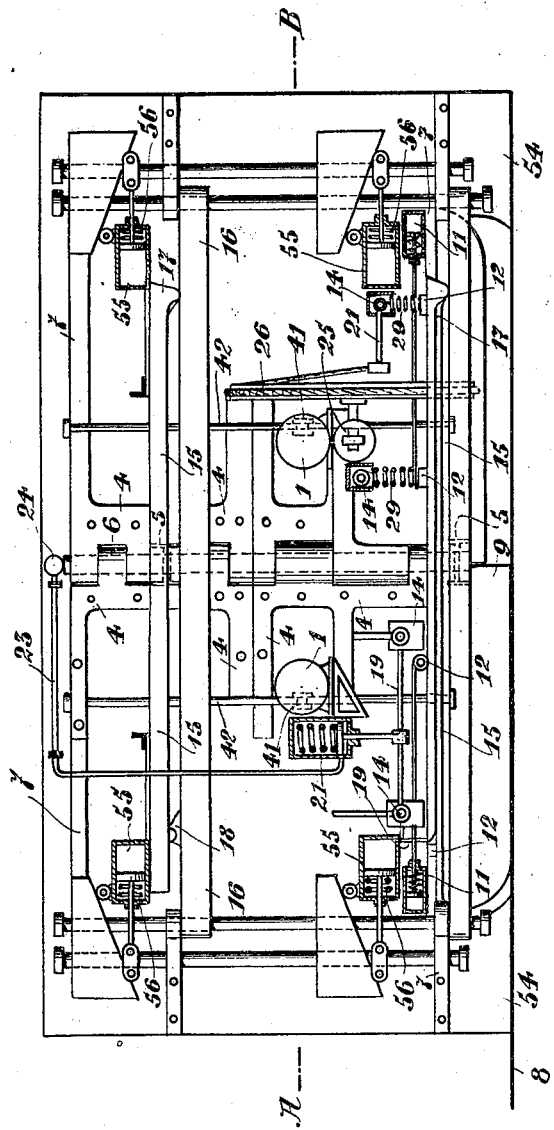
Fig. 1 is a rear view of two constructions, wherein the back wall is removed and the cylinders are illustrated in section.

In all four constructions the walls are swung outwardly by single chambered cylinders 1 to which are pivoted piston rods (Figs. 1 to 7) and which are arranged in the frame of the snow plow parallel with the axis of the rail. After the discharge of steam, the piston rods are drawn inward automatically either as shown in Fig. 1 by resiliently located steam pistons, whereby the spring 2 is illustrated in the inward and extended position according to the positions of the two walls, or by a return spring 3 (Figs. 4 and 7) arranged outside the cylinder. The turned out walls and shovels or scoops are illustrated in Fig. 3 and diagrammatically in Fig. 11.

By means of strong hinged joints 4 (Figs. 1 and 10) the simple vertical walls are arranged rotatable round a shaft 6 supported in two I beam supporting members 5 (Figs. 1 to 7, 10 and 12). The joints 4 are riveted to horizontally disposed top and bottom U-shaped members 7, whereby the wall is properly strengthened. The already known shovels or scoops 9, which are adapted to be raised, lowered and adjusted, form the extent of the down stroke of the walls, terminating about 17 centimetres above the upper face 8 of the rail. In the lowered position, the shovels 9 rest on the rails and with the movable jaws on the bottom wall U-shaped members 7 form an effective lateral bearing of the walls, because they are opened out only after overcoming the closing springs 10. The shovels overlap each other (Fig. 6), so that they can be freely turned inward and outward. For clearing stations and rails, which rest in broken stones, pistons 11 (Figs. 1 to 4 and 8) are pushed underneath, the said pistons being operated by steam and at the same time are arranged resiliently and are located on supports 12 (Figs. 4 and 8) of a height of about 4 to 5 centimetres, which are of a plain or wedge-shaped form and are arranged at the bottom U-shaped member 7, the jaws 14 sliding or running on rollers 13 (Fig. 4) being lowered onto the said supports. The supports 12 are pulled out automatically by the yieldingly located pistons on raising the shovels or scoops.

Figure 3:
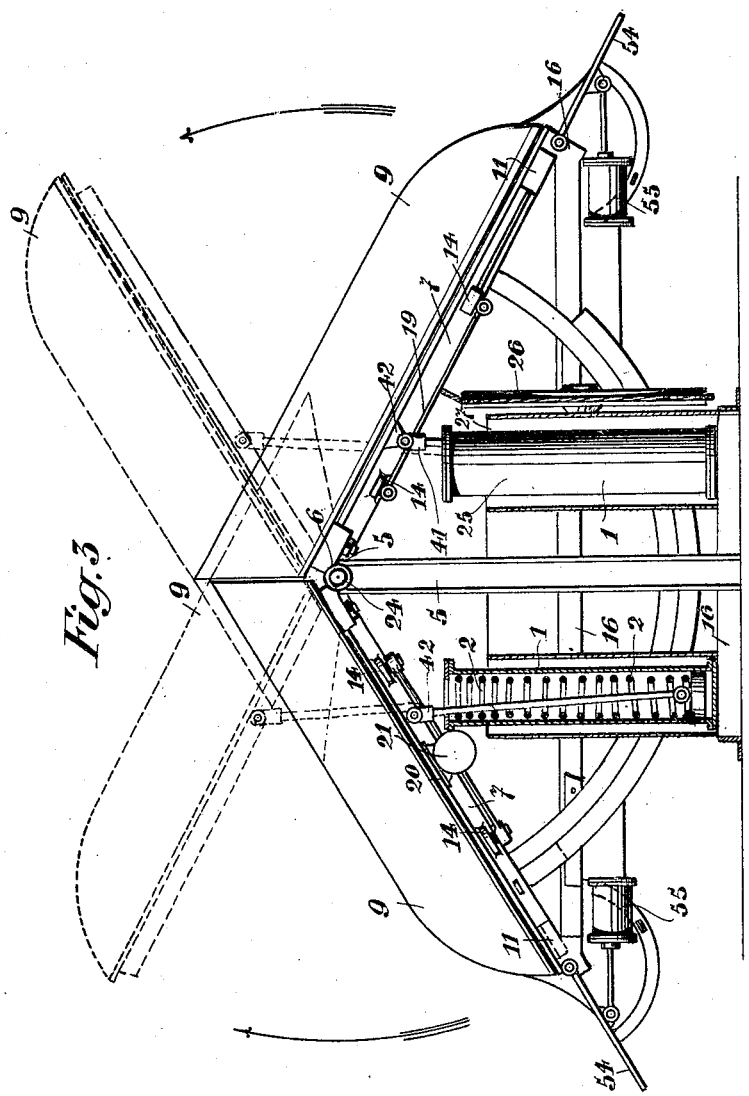
Fig. 3 is a plan view and sectional view respectively, the section being taken on lines 3—3 of Figure 1.

The strengthening of the outwardly moved walls against the pressure of the snow is carried out by two arched members 15 of U-shaped iron, which are riveted to the U-shaped wall members 7 (Fig. 8) and slide on the two U-shaped frame members 16 (Figs. 1, 3 and 4). The end of the arched member terminates in a suitably shaped riveting sheet 17 with a round extension (Figs. 1 and 8), which in the outward position of the wall cooperates with a similar shaped, resiliently located supporting sheet 18, fixed to the U-shaped frame iron 16. Before the extension of the riveting sheet 17 enters into the hollow space or groove of the supporting sheet 18 and thereby is locked, the same slides and depresses the resiliently located support and thereby reduces the hard contact in the extended position. The drawing-in of the wall, which after the discharge of the steam from the cylinder 1 is accomplished automatically by the piston-spring 2 or the return spring 3, takes place after the raising of the shovels. Owing to the raising of the jaws 14 (Fig. 8) by means of an operating bar 19, a lever 20 is moved along at the outside of the arched member, which with its other end pressed against the yielding, locking, supporting member 18 unlocks the arched member by depressing the same, e. g. moves out of the hollow groove the round extension of the riveting sheet 17. According to the chamfering or shaping of the round arched end or of the riveting sheet and of the corresponding hollow groove in the supporting member 18, the resistance of the lock may be regulated conveniently, but has to be such, that in case of unusually heavy blows against the wall the round arched members jump out of the grooves and permit the wall to give way. The forward side of the groove has to be disposed vertical in order to catch the wall in the end position by the engaging round-arched member.

The shovels are raised either at the extended or drawn-in side.

Figure 2:
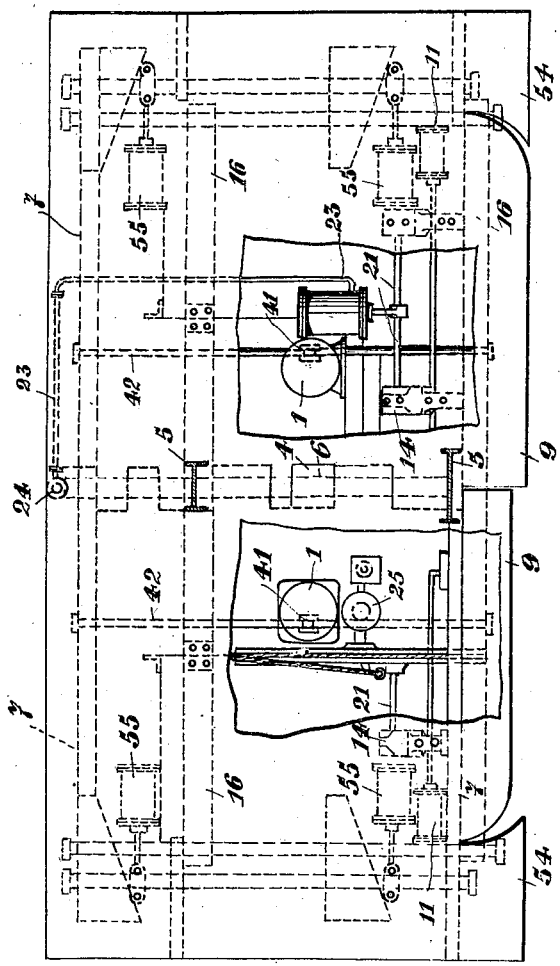
Fig. 2 is a front view of the constructions shown in Fig. 1, wherein the covering plate of the snow plow is partly broken away.

The left half of one construction is shown in Figs. 1 and 3, while the right half thereof is illustrated in Fig. 2. The single-chamber lifting cylinder 20 is secured directly to the wall of the snow plow and its piston rod directly engages the jaw-connecting rod 21 of the shovel and, on being supplied with steam, raises the same against the action of the piston-spring 22. On discharging the steam, the spring depresses the jaws 14 and the shovel respectively. Steam is supplied by a steam piping 23, located in the wall and arranged rotatable in the centre of the snow plow-shaft 6 (Fig. 1) by means of a ball and socket joint 24. For the right hand side lifting cylinder, the steam piping or the joint is arranged at the bottom side of the shaft. The two lifting cylinders are provided with a common steam piping from the driver's stand to the forward wall of the engine and are controlled by a two-way valve of simple construction, because the shovels operate simultaneously.

The right half of another construction is shown in Figs. 1 and 3, the left half thereof in Fig. 2 and Fig. 9 shows the drive on an enlarged scale, and the same consists of a lifting cylinder 25, which is located underneath the cylinder 1 for pushing out the wall and with the same on a common supporting plate, the cylinder 25 being directly coupled with a rope-pulley 26 by means of a rod 27 of the simple construction. The rope-pulley is provided with a straight crank-loop 28, whose engaging block (Figs. 9 and 9$^a$) is taken along by the piston-rod 27. One end of the wire-rope is secured to the rope-pulley, while the other end thereof is directly connected with the jaw-connecting rod 19 of the shovel.

On charging with steam the one sided acting cylinder, the piston-rod by means of the crank-loop takes along the rope-pulley, on which is wound up or off the wire-rope according to its rotation. The lifting cylinder 25 is of such dimensions, that the tension springs 29 (Fig. 1) engaging the movable shovel-jaws, can be overcome together with the weight of the snow resting on the shovel. The four positions of the slot or link or of the piston are diagrammatically shown in Figs. 9 and 9$^a$. On extending the wall at first the shovel is lifted or the slot is moved forward from the end position 1 in Figs. 9 and 9$^a$ into the position 2. On moving out the wall by means of the extension-cylinder 1, the rope-pulley is turned outwardly by overcoming the circumferential force by means of the lifting cylinder 25, charged with steam and the rope is wound off to the extent of the length of the extension-cylinder, whereby the slot comes into the position 3. If now the lifting cylinder 25 is emptied, the rope pulley is placed into the second end position 4 by the shovel-spring 29. During these three movements, the block, engaging the slot or loop, moves in a straight line with the piston stroke of the lifting cylinder. On drawing-in the wall it is sufficient to raise the shovels, whereby the round-arched members are unlocked. The piston moves the rope-pulley in opposite direction and thus draws-in the wall. A separate wall-return spring is not necessary in this construction. Also a chain-wheel and chain may be employed in place of the rope-pulley.

The lifting cylinders 25 at both sides are fed by a common steam-piping and are controlled by a two-way cock.

A third construction is shown in Figs. 4 to 7 and illustrates the raising and lowering of the shovels by means of a leverage 30. The lifting cylinder 31 is directly secured to the bottom double T-shaped frame-support 5 and with the aid of its piston-rod and an intermediate pulley 32 as well as the common rope 33 and the levers 30, secured to the walls, operates the shovels, e. g. the same are lifted against the action of springs 34, exerting a downward pressure. The shovels are automatically lowered by the springs on emptying the cylinders. The stroke of the piston and rope are of such dimensions, that the extension of the stroke effected by the turning-in and out of the wall is taken into consideration. Owing to the weight of the piston, the rope remains in tension in case of lowered shovels. The levers slide on suitable guides 35 in order to relieve the lever-pins during rotation. The lifting cylinder is controlled by a two-way cock.

In another modified construction as shown in Figs. 12 and 13 the raising and lowering of the whole walls of the snow plow is effected by a lifting cylinder 36, mounted on the bottom double T-shaped frame support 5. The pivotally attached piston-rod 37 of the said cylinder engages a lever 38, which consists of two parts and is rotatably secured on the upper double T-shaped support and which by means of its forked ends is pushed onto two bolts 40, arranged on the shaft-collar 39. On charging with steam, the walls are lifted by means of the joints 4 secured to the same and resting on the collar. On discharging steam, the walls are lowered by means of their weight against the action of the spring, acting from below and arranged in the piston or outside the same. The lifting cylinder is controlled by a two-way cock.

The pivoted piston-rods of the extension cylinders 1 of all four constructions operate the walls by means of their roller-joints 41 (Figs. 1 to 6) and an operating shaft 42, secured in the two U-shaped members 7. The joints 41 prevent unfavourable pressures and shocks on the piston-rod. The two extension-cylinders 1 on each wall are fed by two separate steam pipes and are controlled by a common three-way cock.

The front cutting edges of the snow-plow form either the wall-covering sheets rolled round the joints 4 (Figs. 2 and 5) or the cutting means shown in Figs. 10 and 15. The latter is formed by a strong pointed plate 43, whose one end is riveted to the wall of the snow plow, while the other end is slidably guided in slots 44 of the snow plow wall by means of moving bolts 45. The two wings of the cutting plate 43 are rotatable about the edge-link 46 and, as shown in Fig. 16, both ends may be guided in the slotted walls. In order to compensate the extended walls with respect to the initial position the end of the wall is formed of two parts (Fig. 15), whereby by means of suitable connecting rods 48 and connecting bolts 49 guided in slots of the wall, the movable end 47 is positively coupled with the cutting plate 43 and is positively guided with the same, thus pulled-in or pushed out.

Finally the longitudinal frames 50, which connect the U-shaped frame members 7, extending transverse to the axis of the rail, and which extend parallel to the axis of the rail, are arranged extensible (Fig. 14) in order to obtain an effective strengthening of the snow plow on the engine-frame near the top face of the rail by means of sliding out the flanged wall 51 to the engine-clearer 52. The snow plow is fixed to the front of the engine by means of the wedge 53 shown in Fig. 7. As illustrated in Figs. 1 to 6 the side-wings 54 are operated by single-chamber cylinders 55 with yielding pistons and roller joints. The spring 56 automatically draws in the wings on shutting off the steam supply.

A ground support, secured to the bottom side of the lower frame supporting member 5, serves for removing the snow-plow from the forward end of the engine or to erect it at the place of use or to turn it around. The pivot journal 57, secured in the centre of gravity of the snow-plow, is disposed in a sleeve, which is furnished at the outside with a square thread 58 and at the inside with a curved bottom. The screw-threaded sleeve is arranged and operates in the screw-threaded sleeve of a rotatable disc 59, and the height of the pivot journal 57 can be adjusted by being screwed into or out of the latter. A hole 60 is drilled through the two sleeves and the pivot-journal, and in the raised position a pin 61 is pushed through the said hole and secures the rotatable disc in the raised position.

The snow-plow is operated from the driver's stand of the engine. The desired cleaning position of the snow plow depends on the shape of the railing travelled at the time. In case of a double railing the cleaning is effected toward one side. In the event of a single railing the cleaning is carried out at the right or left side according to requirement. In order to obtain the desired positions of the wall-shovels and wings it is necessary only to set the corresponding railway joint. For their protection the shovels or scoops are furnished with the known jaws.

The plow is erected, lifted off and turned round with the aid of the described ground-support, whereby it is possible to change at any time the clearing direction independent of the engine-turn-disc.

We claim:—

1. A snow plow for railway engines, comprising upright plates hinged together on an axis which bisects the line between the rails, pressure operated pistons connected with said plates to swing the plates outwardly on their hinge connection, and springs operating counter to the pistons to return the plates to their initial positions after the pressure on the pistons is released.

2. A snow plow for railway engines, comprising an upright shaft to be supported centrally of the rails, walls hinged at their adjacent upright sides to said shaft, pressure operated means for each wall to swing the same outwardly about the shaft, and spring means for returning each wall to its initial position.

3. A snow plow, as claimed in claim 2, in which the hinged walls terminate in shovels at the lower ends, pressure operated pistons connected to each wall and shovel to elevate the same, and spring connections to return the walls and shovels to lowered positions.

4. A snow plow, as claimed in claim 2, in which the hinged walls terminate in shovels at the lower ends, a rope and tackle connection for the walls and shovels, a pressure operated piston operating the rope and tackle to elevate the walls and shovels, and spring connections for lowering the same.

5. A snow plow, as claimed in claim 2, in which the hinged walls terminate in shovels at the lower ends, means for elevating said walls and shovels, pressure operated pistons for actuating said means, and springs for lowering the shovels to their initial positions.

6. A snow plow, as claimed in claim 2, including wings hinged to the outside upright sides of the walls, pressure operated pistons for operating the wings in outward direction, and spring connections for returning the wings to their initial positions.

In testimony whereof we affix our signatures.

RUDOLF KLIMA.
HANS REISCHENBACHER.